(12) United States Patent
Dai et al.

(10) Patent No.: US 7,089,296 B2
(45) Date of Patent: Aug. 8, 2006

(54) SYSTEM AND METHOD FOR CACHING AND VALIDATING USER AND COMMAND SPECIFIC SERVER RESPONSE MESSAGES

(75) Inventors: Hong Dai, Westford, MA (US); Sami M. Shalabi, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 427 days.

(21) Appl. No.: 10/424,227

(22) Filed: Apr. 25, 2003

(65) Prior Publication Data

US 2004/0215714 A1    Oct. 28, 2004

(51) Int. Cl.
*G06F 15/16* (2006.01)

(52) U.S. Cl. ............. 709/219; 709/203; 709/213; 711/118; 711/144

(58) Field of Classification Search ........... 709/217, 709/219, 218, 213, 203; 707/3, 201, 203; 715/513; 711/118

See application file for complete search history.

(56) References Cited

U.S. PATENT DOCUMENTS

| | | | |
|---|---|---|---|
| 6,012,085 A * | 1/2000 | Yohe et al. | 709/217 |
| 6,385,642 B1 * | 5/2002 | Chlan et al. | 709/203 |
| 6,594,664 B1 * | 7/2003 | Estrada et al. | 709/203 |
| 6,748,425 B1 * | 6/2004 | Duffy et al. | 709/217 |
| 6,904,439 B1 * | 6/2005 | Tang et al. | 707/102 |
| 6,973,618 B1 * | 12/2005 | Shaughnessy et al. | 715/513 |
| 2001/0051927 A1 * | 12/2001 | London et al. | 705/51 |
| 2004/0010543 A1 * | 1/2004 | Grobman | 709/203 |
| 2004/0070609 A1 * | 4/2004 | Estrada | 345/751 |
| 2004/0143599 A1 * | 7/2004 | Shalabi et al. | 707/104.1 |

* cited by examiner

*Primary Examiner*—Hong Kim
(74) *Attorney, Agent, or Firm*—Stephen T. Keohane; Shelley M. Beckstrand (57) ABSTRACT

A system and method is provided for user and command specific place based caching with cache validation, including a server; a database; a server cache; the server responsive to receiving a request message for generating a user-specific cache file name, accessing the server based cache with the file name to obtain a cached response message, validating the cached response message, generating a response message selectively from the cached response message if obtained and validated, and otherwise generating from the database and selectively caching the response message.

17 Claims, 7 Drawing Sheets

SYSTEM AND METHOD FOR CACHING AND VALIDATING USER AND COMMAND SPECIFIC SERVER RESPONSE MESSAGES

CROSS REFERENCES TO RELATED APPLICATIONS

Copending U.S. patent applications

Ser. No. 10/334,296, filed Dec. 31, 2002, entitled "SYSTEM AND METHOD FOR CENTRAL REFRESH OF PLACE OBJECTS" (pending);

Ser. No. 10/334,268, filed Dec. 31, 2002, entitled "SYSTEM AND METHOD FOR SEARCHING A PLURALITY OF DATABASES DISTRIBUTED ACROSS A MULTI SERVER DOMAIN" (allowed);

Ser. No. 09/752,120, filed Dec. 29, 2000, entitled "METHOD AND SYSTEM FOR CREATING A THEME OF A PLACE TO BE USED AS A TEMPLATE FOR OTHER PLACES" (allowed);

Ser. No. 10/349,412, filed Jan. 21, 2003, entitled "SYSTEM AND METHOD FOR HIERARCHICALLY INVOKING RE-ENTRANT METHODS ON XML OBJECTS" (pending); and Ser. No. 10/349,424, entitled "SYSTEM AND METHOD FOR COMMAND LINE ADMINISTRATION OF PROJECT SPACES USING XML OBJECTS" (pending);

are assigned to the same assignee hereof and contain subject matter related, in certain respect, to the subject matter of the present application. The above identified patent applications are incorporated herein by reference.

BACKGROUND OF THE INVENTION

1. Technical Field of the Invention

This invention relates to caching. More specifically, it relates to server executed caching based on application semantics.

2. Background Art

In IBM® Lotus® QuickPlace® server pre-release 3.0 design, each HTTP request from a client browser results in a number of connections to the database before the server is capable of rendering a complete page back to the client browser. Consequently, some database operations are very expensive especially in the case of large databases, resulting in slow response time.

Heretofore, many software products have used caching to improve such response time. However, such products have not recognized and accommodated the need to manage cache operations based on who the user is as well as on project specific validation of cached objects.

Caching of forms in collaboration space has heretofore been done by the place server in memory, and has been lost when the server is terminated.

Domino, IBM, the IBM Logo, Lotus, Notes, QuickPlace are trademarks of International Business Machines in the United States, other countries, or both.

ObBJECTS AND SUMMARY OF THE INVENTION

It is an object of the invention to provide a method and system for server executed caching based on application semantics.

It is a further object of the invention to provide a system and method for user and command specific place based caching with cache validation.

In accordance with the preferred embodiments of the invention, a method is provided for user and command specific place based caching with cache validation, comprising receiving a request message at a server; generating a user-specific cache file name; accessing a server based cache with the file name to obtain a cached response message; validating the cached response message; and generating a response message selectively from the cached response message if obtained and validated, otherwise generating and selectively caching the response message.

Further in accordance with the preferred embodiments of the invention, a system is provided for user and command specific place based caching with cache validation, comprising: a server; a database; a server cache; the server responsive to receiving a request message for generating a user-specific cache file name, accessing the server based cache with the file name to obtain a cached response message, validating the cached response message, generating a response message selectively from the cached response message if obtained and validated, and otherwise generating from the database and selectively caching the response message.

In accordance with an aspect of the invention, there is provided a computer program product configured to be operable to provide user and command specific place based caching with cache validation.

Other features and advantages of this invention will become apparent from the following detailed description of the presently preferred embodiment of the invention, taken in conjunction with the accompanying drawings.

BEST MODE FOR CARRYING OUT THE INVENTION

Caching provides a much more efficient mechanism for getting information from QuickPlace to users over the web. Caching place based page content on the QuickPlace server allows the server to get the page from database once, cache it, and then serve future requests directly from the cache, so long as the cache copy is still valid.

Figure 1:
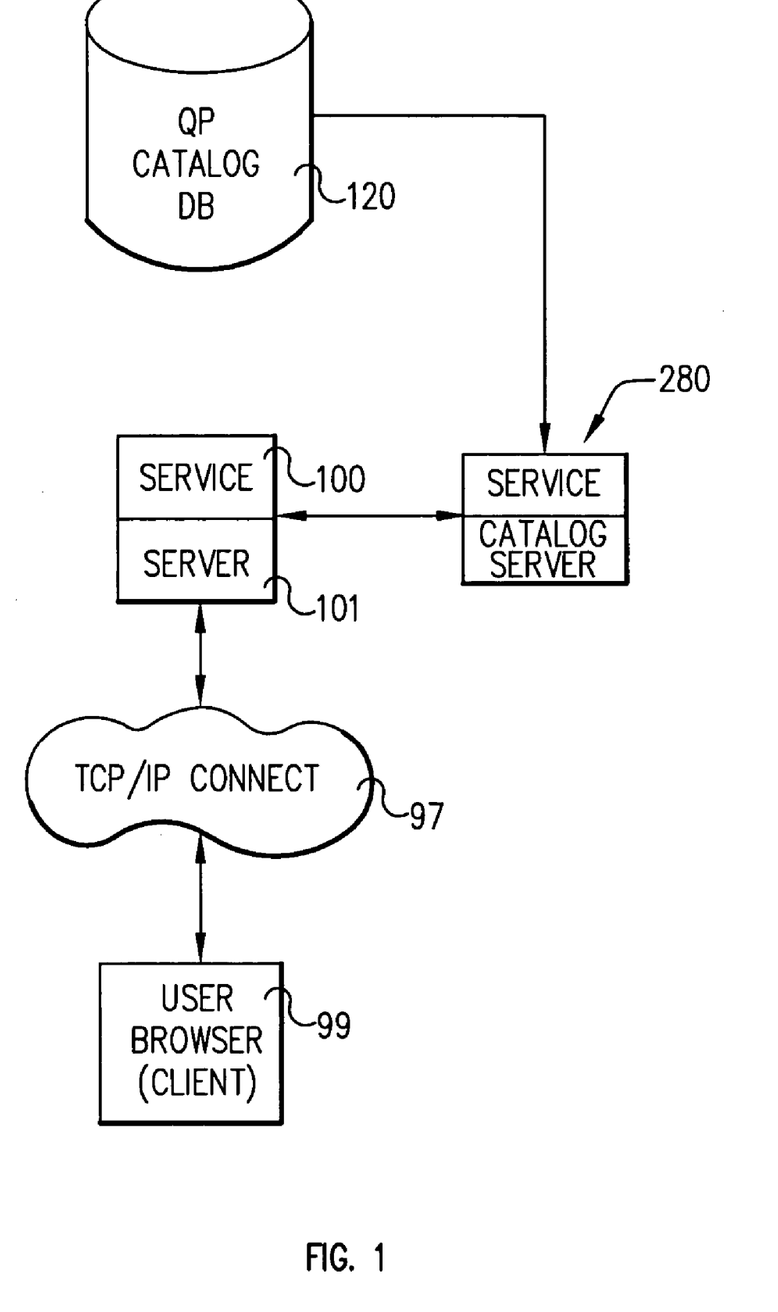
FIG. 1 is a high level system diagram illustrating a system configuration.
Figure 2:
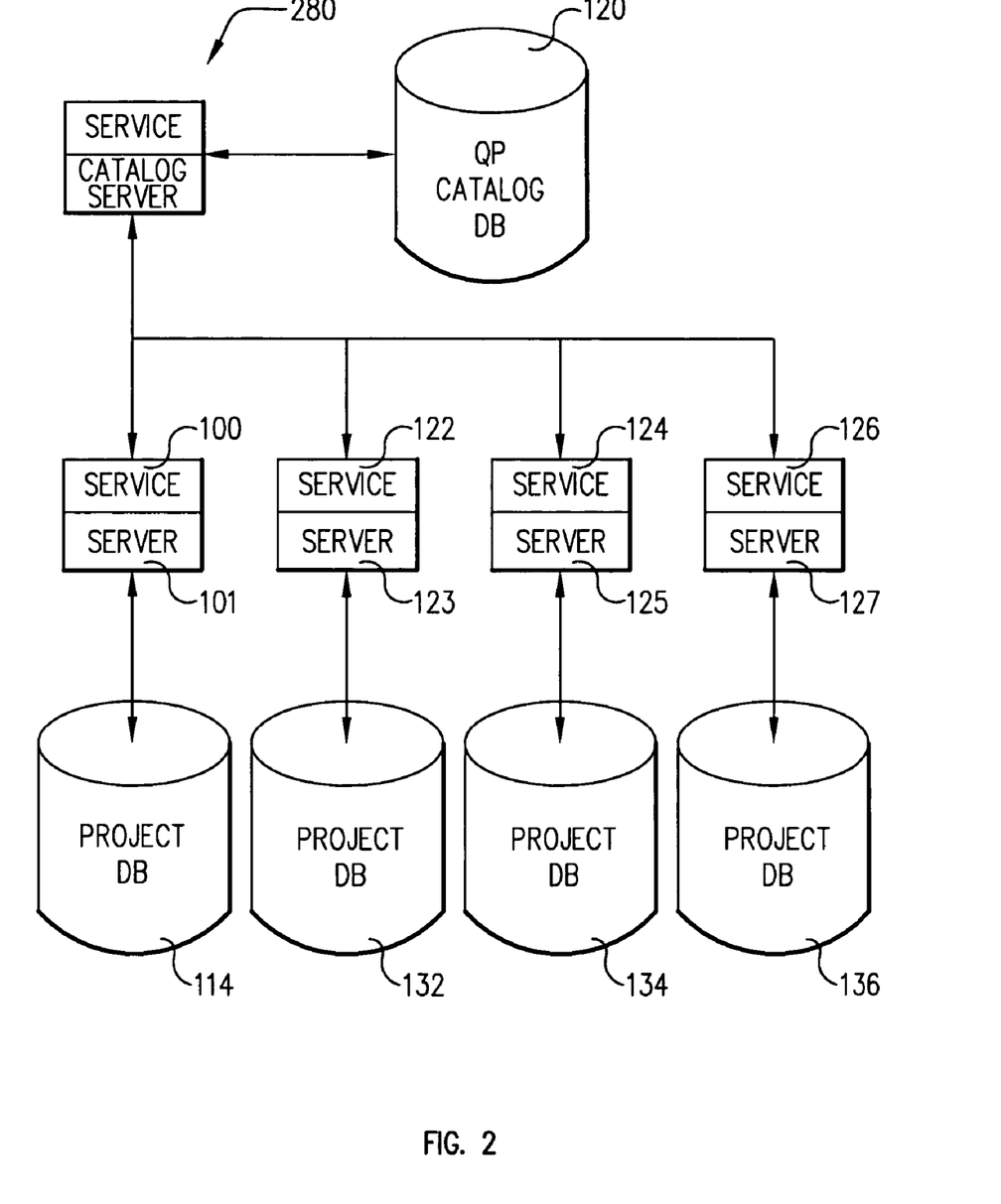
FIG. 2 is a high level system diagram illustrating a multi-server system environment.

Referring to FIGS. 1 and 2, catalog 120 is a database, such as an IBM® Lotus® QuickPlace® catalog, for aggregating information about projects, such as QuickPlaces 114, 132, 134, 136, in a multi-server system environment, including service 100/server 101, 122/123, 124/125, and 126/127, communications link 97, and one or more client terminals, such as user browsers 99.

Throughout this specification, the generic term "project" and more specific terms "place" or "QuickPlace" are used substantially interchangeably. Place and QuickPlace, terms used primarily in connection with the IBM QuickPlace and IBM Lotus Domino products, are specific examples of projects. "Places", and as used herein "projects", are databases or other entities containing searchable data to which access is controlled, such as by access control lists.

The functionality available to each user via remote terminals 99 may be customized in accordance with the needs and authorization of the user and/or entity. Terminals 99 may access the system using, for example, browser software technology or other electronic accessing methods known to those of skill in the art. Reports and other information displayed to the end user at terminal 99 may be displayed using known web page formatting techniques.

Communication link 97 links remote terminals 99 to server 101. Link 97 may be a hardwired link, such as a telephone line, coaxial cable, digital data line, or the like, or a wireless link such as a radio frequency or infrared communications link, or the like.

As illustrated in FIG. 1, a QuickPlace service 100 represents a group a servers that are able to communicate with each other through a network, and work together to provide function (such as project creation, search across projects and servers, and get aggregate view across all servers and projects).

In a preferred embodiment, this service is implemented in an abstract sense, in that each server 100 implements a notion of service, which in this sense is a multi-server deployment of QuickPlace servers 101 that can be treated as a consistent unit of service for administration and in the user interface.

A QuickPlace service 100 comprises multiple QuickPlace servers 101 and/or QuickPlace clusters, which: (1) are in the same domain (such as a Domino domain); (2) share the same user directory and authentication system; (3) are on the same user network (i.e., are not separated by a firewall); and (4) are administered by the same administration team. These constraints are enough to ensure across the service that: (1) servers 101 can be configured consistently; (2) servers 101 can communicate and share data with each other; (3) user identities are in the same name space and do not collide; and (4) single sign-on authentication can be implemented.

Figure 3:
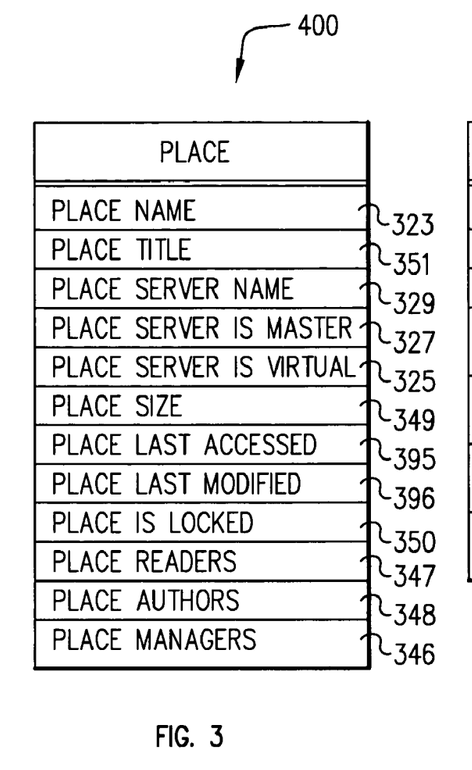
FIGS. 3 and 4 are diagrams illustrating the place and server catalog entries, respectively.
Figure 4:
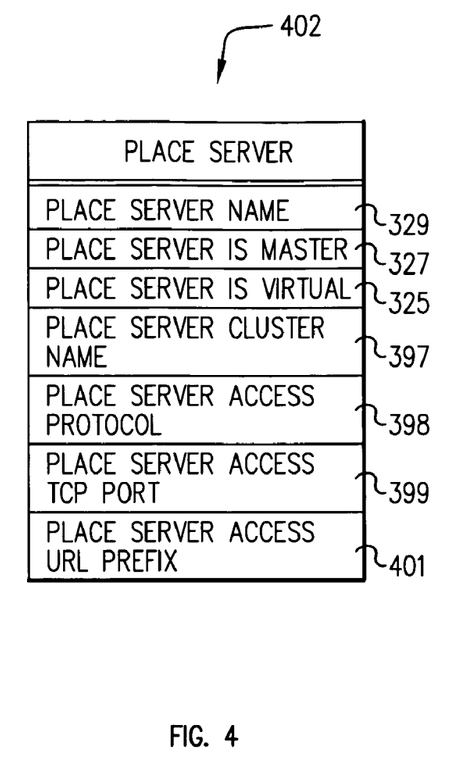

Referring to FIGS. 3 and 4, information 400, 402 stored in host catalog 120 includes for each QuickPlace server 101, 123, 125, 127 in the enterprise:

PlaceServerName 329,
PlaceServerAccessProtocol 298,
PlaceServerAccessTCPPort 399,
PlaceServerAccessURLPrefix 401,
PlaceServerIsMaster 327,
PlaceServerIsVirtual 325,
PlaceServerClusterName 397;

and for each place 114, 132, 134, 136 in the enterprise:

PlaceName 323,
PlaceTitle 351,
PlaceServerName 329,
PlaceManagers 346,
PlaceAuthors 348,
PlaceReaders 347,
PlaceSize 349,
PlaceLastAccessed 395,
PlaceLastModified 396,
PlaceIsLocked 350,
PlaceServerIsMaster 327, and
PlaceServerIsVirtual 325.

Host catalog 120 contains data on the QuickPlace servers 101 in a service 100, the places 114 that reside on those servers, and the members of those places. Each server 101 and each place 114 in the service 100 has a separate entry in catalog 120. In an exemplary embodiment, a catalog entry is implemented as a database record, such as a Lotus Notes® note. The enterprise administrator may decide to have one catalog 120 for the enterprise or to have several catalogs servicing separate areas of the enterprise.

Host catalog database 120 may be created using a place catalog or Notes template (.ntf file).

Figure 5:
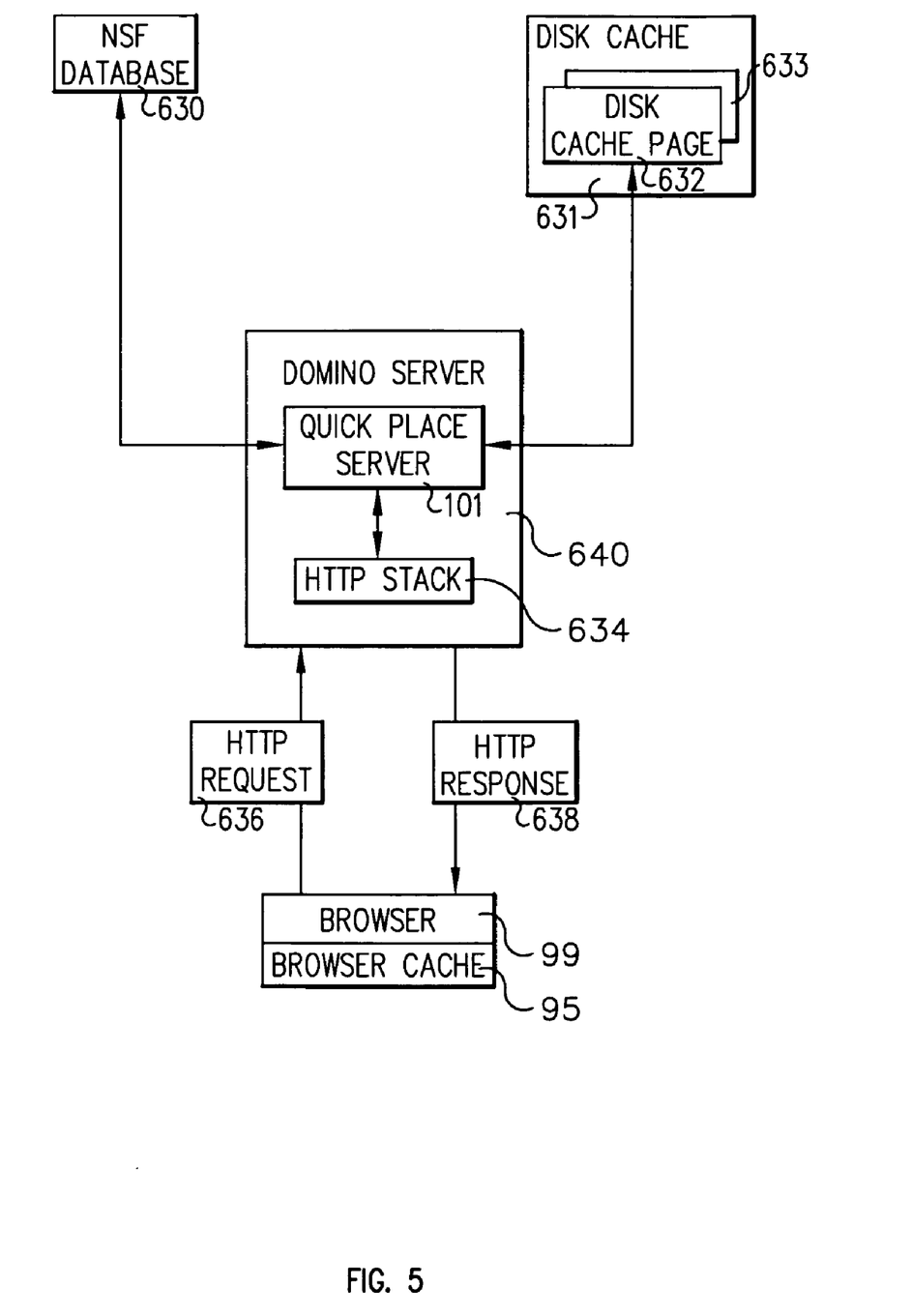
FIG. 5 is a high level system diagram illustrating the caching system of the preferred embodiment of the invention.

Referring to FIG. 5, when a HTTP request 636 comes in to server 640, such as an IBM® Lotus® Domino™ server, HTTP stack 634 sends the request to the project or place 101, such as a QuickPlace server, if the request is a QuickPlace request. QuickPlace server 101 then processes the request, opening Notes databases 630 (NSF files) and relevant notes to acquire data, render a place based page and finally send resulting HTTP response page 638 back to browser 99 through HTTP stack 634. During this process, the most time spent is in the page rendering process because accessing data in a Notes database 630 is an expensive process.

After the page content is rendered, a copy of the page content is cached by saving it in the file system, or cache, 631 on server 640. The next time the same user request comes in, QuickPlace server 101 can get the copy from disk cache 631 directly and send it back to client, instead of going through the expensive page rendering process again.

In accordance with the preferred embodiment of the invention, a system and method is provided for determining what is cachable, matching a cache copy to a specific request, validating the cache copy, and cleaning up the cache when it becomes full.

1. Determining what is Cachable.

Only the page content that can be used to answer future requests 636 is cachable. Hence, only QuickPlace response pages 638 to HTTP GET requests and to QuickPlace Open-Document commands are cached. A response page 638 is only cachable if the request 636 is processed successfully. In an exemplary embodiment, QuickPlace server 101 utilizes a three-digit status code to indicate whether request 636 is successfully processed or if some kind of error occurred.

Some of the QuickPlace responses, for example, JavaScript file and style sheets, are already cached in browser cache 95 at browser 99, and such will not be cached again by QuickPlace server 101.

QuickPlace based page content cache 631 is organized per user, with separate pages 632, 633 cached for different users. The server administrator can specify in a notes.ini file those cache users, including anonymous user, whose response pages 638 will be cached by server 101 in cache pages 632, 633, etc.

2. Matching a Cache Copy to a Specific Request.

Figure 6:
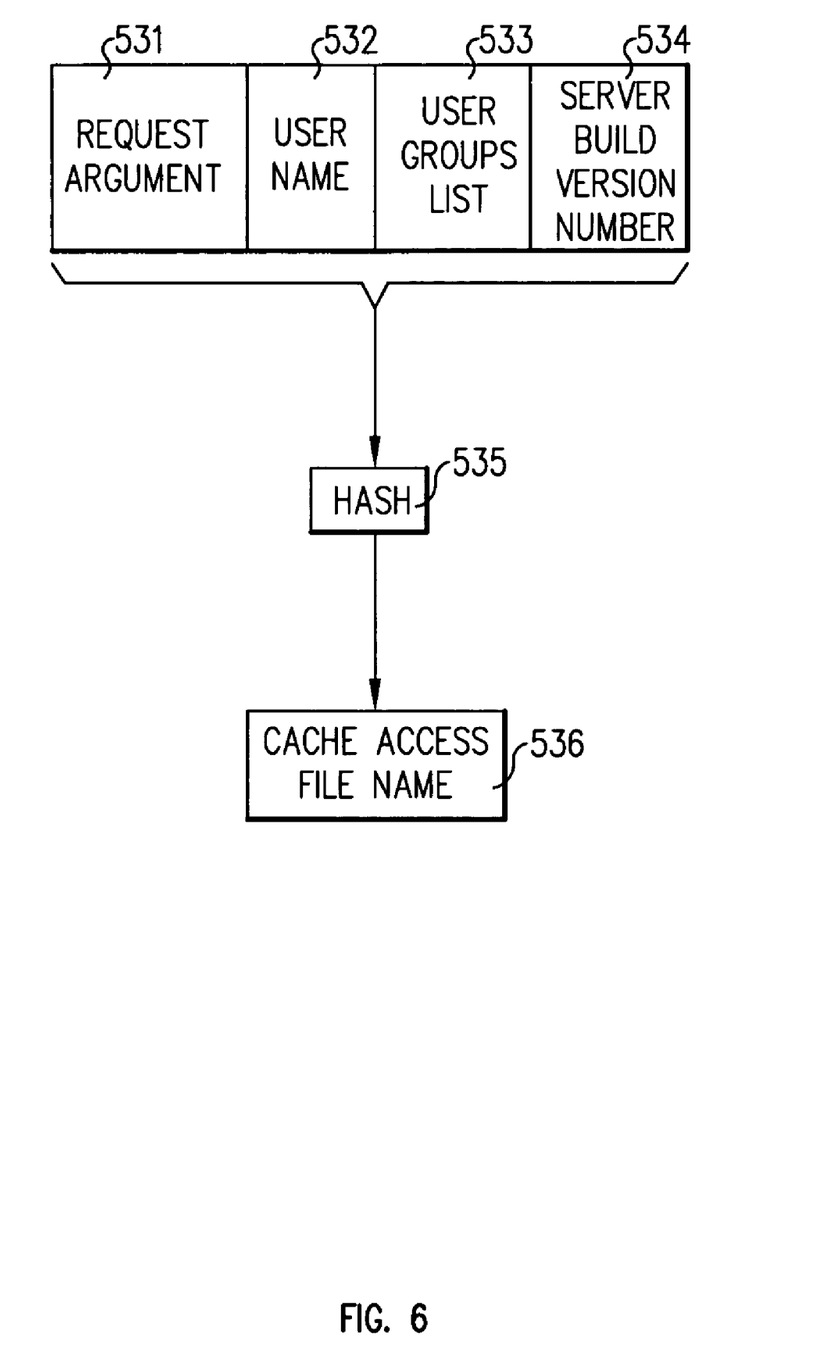
FIG. 6 is a diagram illustrating the creation of cache access file names.

Referring to FIG. 6, in order to match a cache copy 632 to a specific request 636, a string is constructed by concatenating the request argument 531, the user name 532 and his/her names list list 533 and the server 101 build version number 534. The string is then re-computed with a hash algorithm 535 to produce a much more condensed and secure representation of the string. This condensed string is then used by server 640 as the file name 536 for accessing cache 631. A names list 533 is the credential set that Notes databases use to grant access. A names list 533 comprises the user's distinguished name (DN) as well as the DNs of that user's group memberships.

By thus calculating the file name:

a) Cached page content 632 is per request. Since the request argument 531 is built into the file name 536, different requests result in different cache copies 632, 633.

b) Cached page content is per user. QuickPlace allows different membership and different access levels, so even for the same request, the page 632, 633 content returned by QuickPlace server 101 may be different for different users. Since the user name 532 is built into the file name 536 of cache copy 632, it is assured that the cached page content is per user. In addition, since the names list 533 of the user is also built into the file name 536, it is also assured that any change in group membership of this member will automatically invalidate the cached file copy 632.

c) The cached file copies 632, 633 are per QuickPlace 101 release. When QuickPlace server 101 is upgraded, the whole cache 631 for the places on server 101 need to be invalidated. Adding the QuickPlace build number 534 into the file names 536 for entries 632, 633 in cache 631 insures that happens automatically.

d) The file name 536 is secure. The concatenated long string, which has the request argument 531, the user name 532 and his/her group information 533, and the QuickPlace build number 534, is re-computed with a hash algorithm 535 to produce a condensed string digest 536 from which it is more difficult to extract sensitive information.

3. Validating a Cache Copy.

Figure 7:
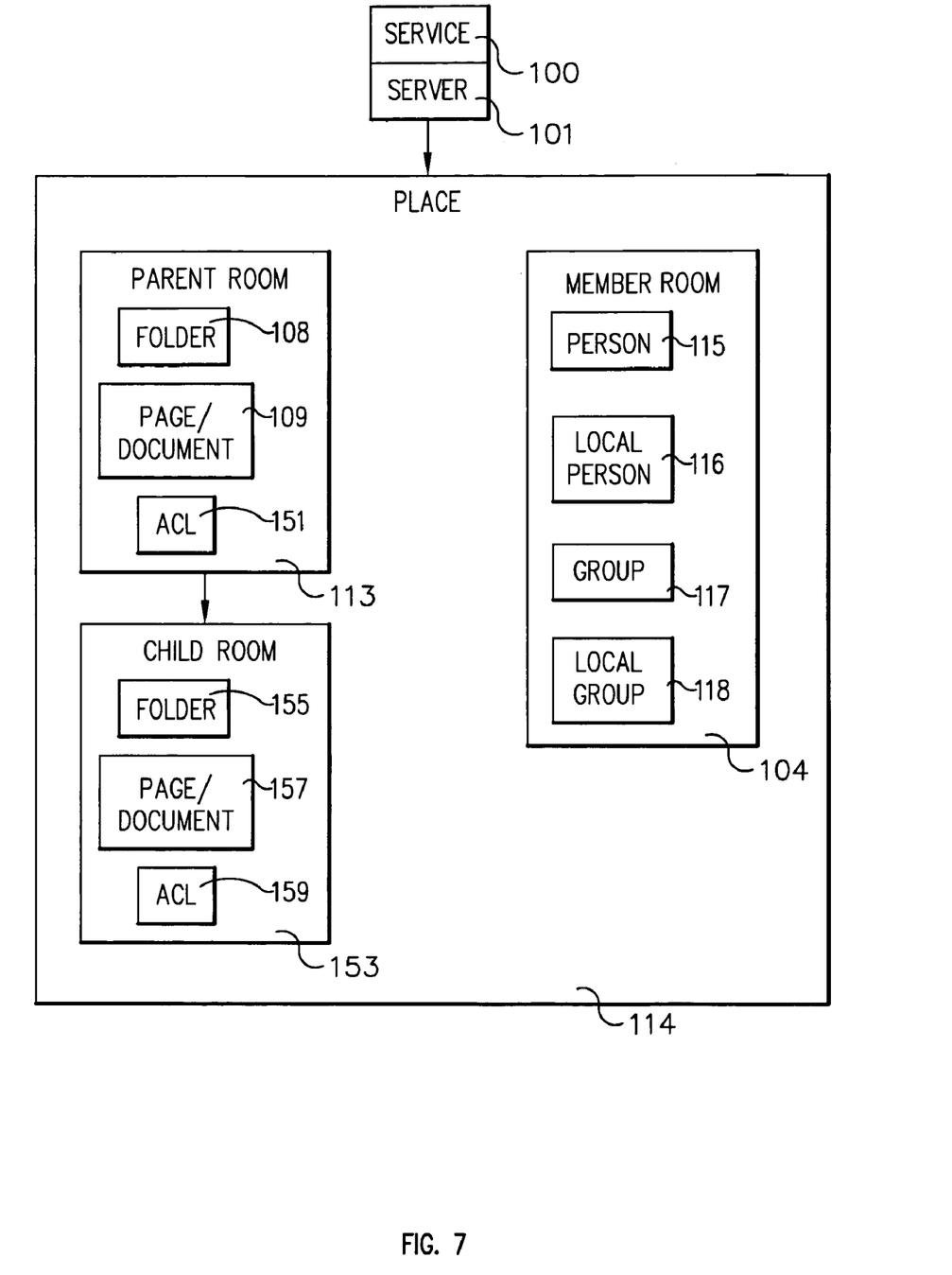
FIG. 7 is a high level system diagram illustrating selected components of collaboration space.

Referring to FIG. 7 in connection with FIG. 5, the cached page 632, 633 content must be still valid when used to serve current requests 636. Updates made to databases 630 may result in related cache 631 copies no longer being current and valid. So, before sending a cached QuickPlace page 632 to a user, the cached file 632 is validated by comparing the last modified date of the cached file 632 on disk 631 with the last modified date of the following databases 630:

a) Current Room Database 153

Any change in a room 153 will result in all cached pages 157 of the room and its child rooms being invalidated.

b) Any Parent Rooms' Database 113

Any change in parent rooms 113 of room 153 will result in all cached pages of that room 153 being invalidated.

c) This Place's 114 Top Room Database (Main.nsf) 113

Any change in top room 113 will result in all cached pages of that place 114 being invalidated.

d) This Place's 114 Contacts Database (members room) 104

Any change in the members room 104 of place 114 will result in all cached pages 109, 157 of that place 114 being invalidated.

e) QuickPlace Server Setup Room Database

Any change in the QuickPlace server 101 setup room (not shown) will result in all cached pages 109, 157 for all places 114 on the server 101 being invalidated.

Since the server 101 build number 534 is built into the file name 536 of the cache copy 632, when the server 101 build number 534 changes, i.e., server 101 is upgraded from one release to a next release, the entire cache 631 will be invalidated for all places 114 on server 101.

4. Cleaning up Cache when Full.

Cache 631 has limited size. The size is dictated by the actual disk space on the server machine 640 and the size specified by the QuickPlace server administrator. When the cache size reaches its limit, old cached pages 632, 633 must be removed to make space for new ones. One approach implements FIFO (First In, First Out) algorithm. A cache list (not shown) is maintained in memory where newly added cache pages are always on top of the list. Cached pages 631, 632 are purged from the tail of the list until cache size is lower than the cache limit.

Figure 8:
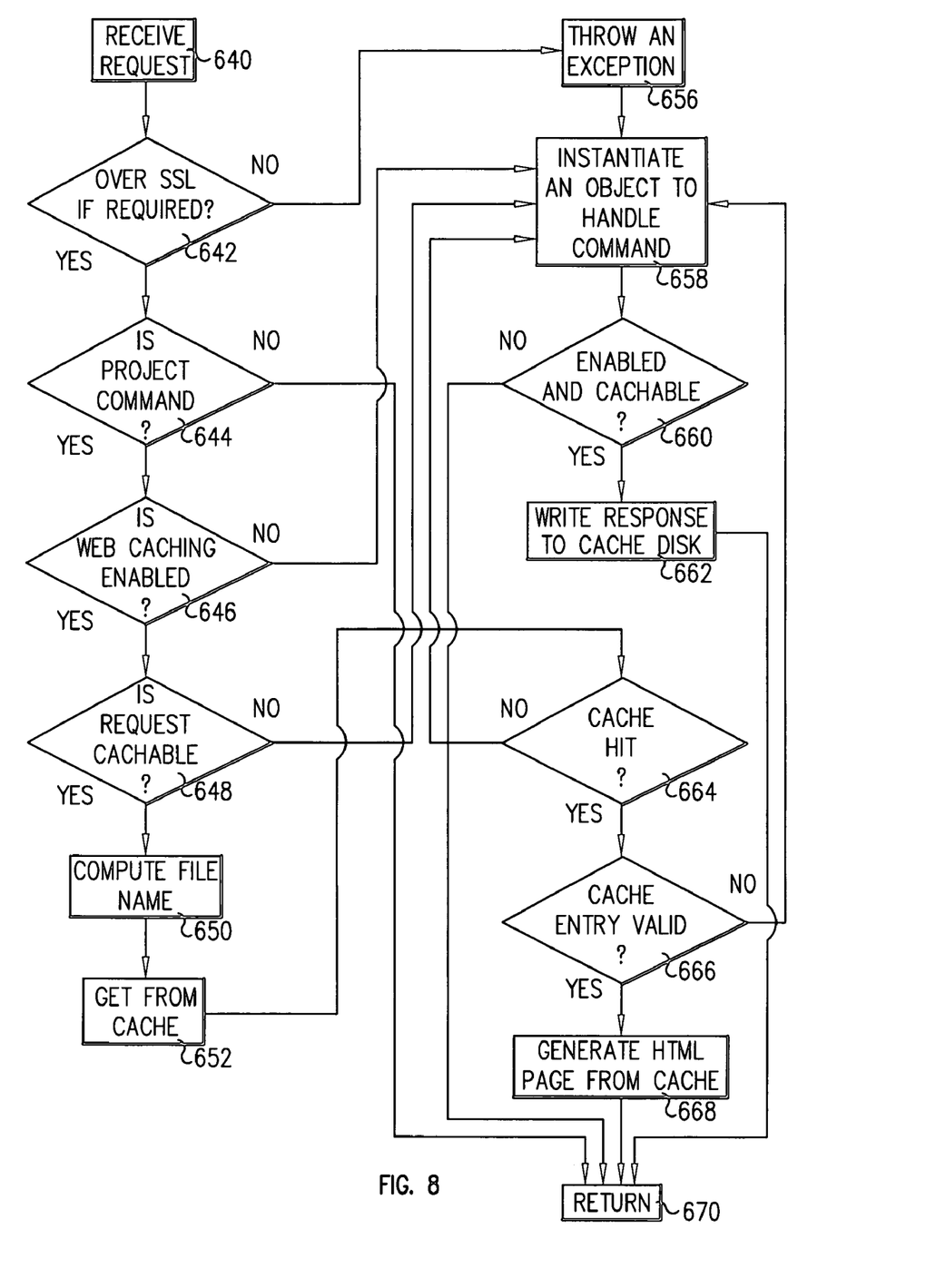
FIG. 8 is a flow chart illustrating the caching method of an exemplary embodiment of the invention.

Referring to FIG. 8, in accordance with an exemplary embodiment of the method of the invention, in step 640 a request 636 is received by server 101. Step 642 the server determines if the request was received for an SSL link if an SSL connection is required by server 640; if not received over an SSL link when required, server 101 throws an exception 656.

Step 644 determines if the request 636 is a command of a type pertinent to server 101 (that is, a project or place command), and if not, a return is executed in step 670.

Step 646 determines if web caching is enabled, such as by an appropriate flag set in a notes.ini file. If not, in step 658 an object is instantiated to handle the command.

Step 648 determines if this request 636 is cacheable. If not, in step 658 an object is instantiated to handle the command. Such an object, in a Notes Domino example, could be: Haiku::HandleDominoCmd(Cmd* cmd).

A response to a request is cachable only when the request is a GET request, when the command is an OpenDocument command, when the response will not be cached at browser 99 (such as JavaScript files and style sheets), and when the response status code indicates success.

Step 660 determines if web caching is now enabled and the request processed by the object instantiated in step 658 is cachable, then in step 662 the response is written to cache disk 632 and in step 670 the return is executed. In step 646, the check is against the server setting and a flag is set. Future checking, such as in step 660, is done with the flag. Web cache is enabled/disabled through server configuration file (notes.ini).

If the request is cacheable, in step 650 a file name is computed from the request URL, user's names list and server build number. For example, HuWebCache::GetFileName(Cmd* cmd, LMBCS* szFileName).

In step 652, cache 632 is accessed with the computed file name, such as in the example:

```
BOOL HuWebCache::Get(LMBCS* szFileName,Cmd* cmd,
FileCacheEntry* pFileCacheEntry).
```

Step 664 determines if there is a cache hit. If not, processing branches to step 658, previously described. If there is a cache hit, step 666 determines if the cache entry is valid and if not, processing branches back to step 658 as previously described.

A cache entry is determined to be valid in step 666 if the content of cache 632 is consistent with database 630. This will be the case when the last modified date of the cached file on disk 632 is not earlier than the last modified date of the current room, all parent room, this QuickPlace's contacts, and this QuickPlace's set up databases 630. Thus, if the server build changed, i.e., was upgraded, then the entire cache 632 is invalidated for all places on server 101. If the server set up database admin.nsf 630 has been modified, the entire cache 632 is invalidated for all places one server 101. If contactsl.nsf 630 has been modified, only the cache 632 for that place is invalidated. If the top room Main.nsf is modified for a place, only that place's cache 632 is invalidated. If the place's current room PageLibraryXXX.nsf 630 has been modified, only the cache for that current room and its child rooms are invalidated.

Cache 631 may be initialized, in an exemplary embodiment based on QuickPlace, in Haiku::InitClas( ) and terminated in Haiku::TermClass( ). Initialization includes the following: (1) set cache directory (not shown). If the directory does not pre-exist, it is created on disk. Otherwise, cache files 632, 633 are loaded from the directory. (2) Set cache size limit. (3) Set time interval for cache cleaning and enable a separate thread to do the cleaning.

In accordance with the preferred embodiments of the invention, a caching mechanism is controlled based on application semantics. A place based page control may be different for different users and it may even change for the same user if his/her access right changes. When QuickPlace upgrades to a new version, all the pages change due to the new design. The algorithm of FIG. 6 to build the cache file name 536 uses the user's name list 532 which reflects the user's access right, the user's time-zone preference, and the build version 534. When any of these change, the resulting file name 536 will be different and automatically invalidates any previous cached copy 632 for the request 636.

Administrators can control the cache system in a manner transparent to users. Thus, administrators can invalidate the entire cache 631 on server 101 by updating administration settings. Managers of an individual place can also invalidate its cache by updating members 115–118 or top room 113. Authors of a place 114 can control the cache for a room 113 and all children (inner) rooms 153 by updating a parent room 113.

When the access rights of a user change or the place is upgraded, the cache file name calculated for the same request will be different, resulting in the previous cache files to be invalidated.

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a magnetic or optical tape or disc, or the like, for storing signals readable by a machine, for controlling the operation of a computer according to the method of the invention and/or to structure its components in accordance with the system of the invention.

Further, each step of the method may be executed on any general computer, such as IBM Systems designated as zSeries, iSeries, xSeries, and pSeries, or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A method for user and command specific place based caching with cache validation, comprising:
   receiving a request message at a server;
   generating a user-specific cache file name;
   accessing a server based cache with said file name to obtain a cached response message;
   validating said cached response message; and
   generating a response message selectively from said cached response message if obtained and validated, otherwise generating and selectively caching said response message.

2. The method of claim 1, further comprising generating said user-specific cache file name as a hashed concatenation of a request argument, a user name, a user's name list, and a server build version.

3. The method of claim 2, further comprising inhibiting caching of said response message at said server based cache for responses cached in browser cache.

4. The method of claim 2, further comprising receiving administrator defined specification of cache users, selectively including anonymous user, whose response pages will be cached in said server based cache.

5. The method of claim 2, further comprising invalidating a cached response message responsive to any change in group membership of a member submitting said request message.

6. The method of claim 2, further comprising invalidating a cached response messages responsive to a change is said server build version.

7. The method of claim 2, further comprising invalidating said cached response message for all cached pages of a room having a last modified date later than a last modified date of said cached response message.

8. The method of claim 2, further comprising invalidating said cached response message for all cached pages of a child room for which a change is made to its parent room.

9. The method of claim 2, further comprising invalidating said cached response message for all cached pages of a place for which a change has been made to its members room.

10. The method of claim 2, further comprising invalidating said cached response message for all places on a server having had a change to its setup room.

11. The method of claim 2, further comprising invalidating all cached response messages responsive to said server being upgraded.

12. A system for user and command specific place based caching with cache validation, comprising:
    a server;
    a database;
    a server based cache;
    said server responsive to receiving a request message for generating a user-specific cache file name, accessing said server based cache with said file name to obtain a cached response message, validating said cached response message, generating a response message selectively from said cached response message if obtained and validated, and otherwise generating from said database and selectively caching said response message.

13. The system of claim 12, further comprising:
    a browser;
    a browser cache;
    said server further for
      generating said user-specific cache file name as a hashed concatenation of a request argument, a user name, a user's name list, and a server build version;
      inhibiting caching of said response message at said server based cache for responses cached in said browser cache;
      receiving administrator defined specification of cache users, selectively including anonymous user, whose response pages will be cached in said server based cache;
      invalidating a cached response message responsive to any change in group membership of a member submitting said request message;
      invalidating a cached response messages responsive to a change is said server version;

invalidating said cached response message for all cached pages of a room having a last modified date later than a last modified date of said cached response message;

invalidating said cached response message for all cached pages of a child room for which a change is made to its parent room;

invalidating said cached response message for all cached pages of a place for which a change has been made to its members room;

invalidating said cached response message for all cached pages of a place for which a change has been made to its members room;

invalidating said cached response message for all places on a server having had a change to its setup room; and invalidating all cached response messages responsive to said server being upgraded.

14. A program storage device readable by a machine, tangibly embodying a program of instructions executable by a machine to perform method steps for user and command specific place based caching with cache validation, said method comprising:

receiving a request message at a server;

generating a user-specific cache file name;

accessing a server based cache with said file name to obtain a cached response message;

validating said cached response message; and generating a response message selectively from said cached response message if obtained and validated, otherwise generating and selectively caching said response message.

15. The program storage device of claim 14, sad method further comprising:

generating said user-specific cache file name as a hashed concatenation of a request argument, a user name, a user's names list, and a server build version;

inhibiting caching of said response message at said server based cache for responses cached in said browser cache;

receiving administrator defined specification of cache users, selectively including anonymous user, whose response pages will be cached in said server based cache;

invalidating a cached response message responsive to any change in group membership of a member submitting said request message;

invalidating a cached response messages responsive to a change is said server version;

invalidating said cached response message for all cached pages of a room having a last modified date later than a last modified date of said cached response message;

invalidating said cached response message for all cached pages of a child room for which a change is made to its parent room;

invalidating said cached response message for all cached pages of a place for which a change has been made to its members room;

invalidating said cached response message for all cached pages of a place for which a change has been made to its members room;

invalidating said cached response message for all places on a server having had a change to its setup room; and invalidating all cached response messages responsive to said server being upgraded.

16. A computer program product for user and command specific place based caching with cache validation comprising:

a computer readable medium;

first program instructions for receiving a request message at a server;

second program instructions for generating a user-specific cache file name;

third program instructions for accessing a server based cache with said file name to obtain a cached response message;

fourth program instructions for validating said cached response message; and fifth program instructions for generating a response message selectively from said cached response message if obtained and validated, otherwise generating and selectively caching said response message; and wherein said first, second. third, fourth. and fifth program instructions are recorded on said computer readable medium.

17. The computer program product of claim 16, further comprising:

sixth program instructions for generating said user-specific cache file name as a hashed concatenation of a request argument, a user name, a user's names list, and a server build version;

seventh program instructions for inhibiting caching of said response message at said server based cache for responses cached in said browser cache;

eighth program instructions for receiving administrator defined specification of cache users, selectively including anonymous user, whose response pages will be cached in said server based cache;

ninth program instructions for invalidating a cached response message responsive to any change in group membership of a member submitting said request message;

tenth program instructions for invalidating a cached response messages responsive to a change is said server version;

eleventh program instructions for invalidating said cached response message for all cached pages of a room having a last modified date later than a last modified date of said cached response message;

twelfth program instructions for invalidating said cached response message for all cached pages of a child room for which a change is made to its parent room;

thirteenth program instructions for invalidating said cached response message for all cached pages of a place for which a change has been made to its members room;

fourteenth program instructions for invalidating said cached response message for all cached pages of a place for which a change has been made to its members room;

fifteenth program instructions for invalidating said cached response message for all places on a server having had a change to its setup room; and sixteenth program instructions for invalidating all cached response messages responsive to said server being upgraded; and wherein said sixth, seventh, eighth, ninth, tenth, eleventh, twelfth, thirteenth, fourteenth, fifteenth, and sixteenth program instructions are recorded on said computer readable medium.

* * * * *